June 23, 1959
R. A. OSTROM ET AL
2,892,064
SHOCK MOUNT ASSEMBLY FOR ELECTRICAL DEVICES
Filed May 26, 1958
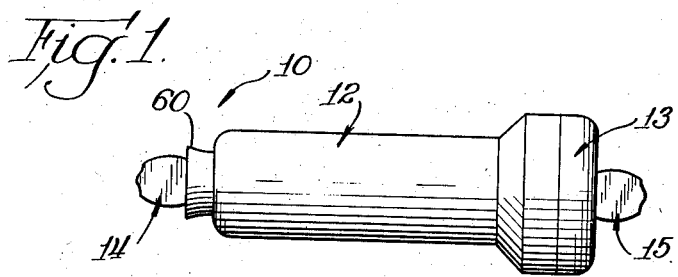
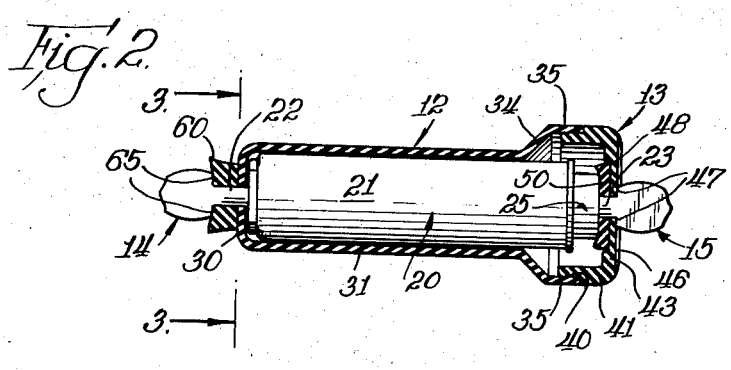
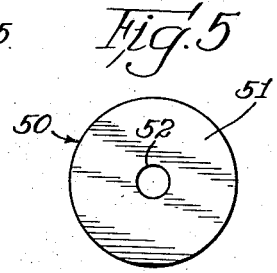
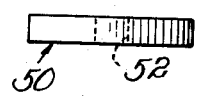
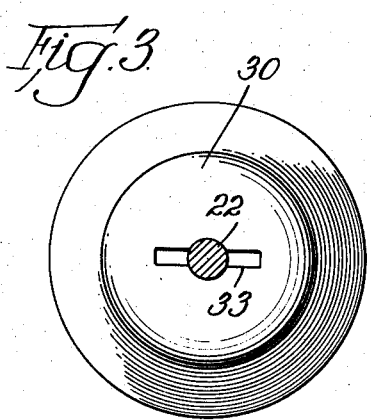
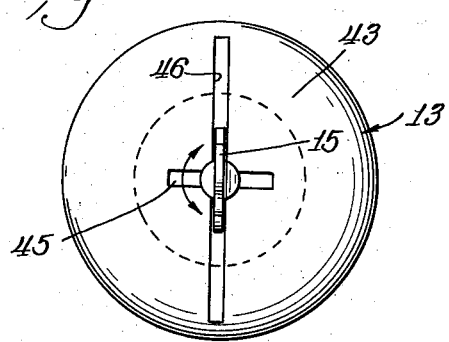
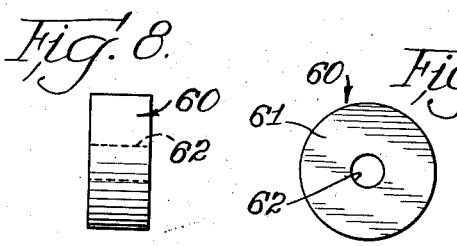
INVENTORS
Raymond A. Ostrom
and Joseph K. Lentz
By [signature]
Att'ys.

United States Patent Office 2,892,064
Patented June 23, 1959

2,892,064

SHOCK MOUNT ASSEMBLY FOR ELECTRICAL DEVICES

Raymond A. Ostrom, Mishawaka, and Joseph K. Lentz, Elkhart, Ind., assignors to Durakool, Inc., Elkhart, Ind., a corporation of Indiana Application May 26, 1958, Serial No. 737,733

6 Claims. (Cl. 200—168)

This invention relates to mounting means and more particularly to an improved shock mounting for electrical devices, such as mercury relays and switches.

It is common practice to enclose electrical devices, such as switches and relays, in a housing, which may constitute an enclosing envelope of insulating material for protecting and containing the active operating elements of the device. It is particularly important to the operation of mercury switches and relays that the same be insulated, so far as possible, from influences which might alter their operating characteristics and accuracy. Vibrational shock is one influencing factor which is to be avoided so far as is possible. Moisture is another factor which can alter the operational characteristics and life of a mercury relay, switch, or similar device and is, therefore, likewise to be avoided.

The present invention is directed to an improved mounting or assembly, particularly directed to the insulation of mercury relays and switches from shock and moisture while the same is enclosed in a suitable protective housing. In brief, the invention includes a two-part housing of substantially tubular configuration which is designed to enclose the sealed envelope and plunger system of the relay or similarly, the activating elements of a mercury switch. Suitable openings are provided in the walls of the housing to accommodate the extension of circuit connective electrodes and terminals. Shock resistant members are also included to seal the interior of the housing against moisture and insulate the actuating elements against undesired movement, as might be caused by the influence of vibrational shock or impact. It will be understood, in this respect, that while the description of the invention which hereinafter follows is related to the particulars of a mercury relay, such is for purposes of illustration only and is not intended as a limitation on the scope of the invention or restriction on the use thereof.

The main object of this invention is to provide a new and improved shock mounting means for electrical devices, such as mercury switches and relays.

Another object of this invention is to provide a new and improved shock mounting means, as aforesaid, which includes compressive seal elements for resisting vibrational shock and impact.

An additional object of this invention is to provide a new and improved assembly for enclosing a mercury relay or switch in a manner suitable to seal the same against moisture and insulate against vibrational impact and shock.

The above and further objects, features, and advantages of this invention will appear to those familiar with the art from the following detailed description of a preferred embodiment of its concepts, as found in the illustrations of the accompanying drawings.

In the drawings:

Figure 1 is a side elevational view of a typical assembly for a mercury relay in which the features of this invention are embodied;

Figure 2 is a cross-sectional view of the assembly illustrated in Figure 1, taken substantially along the longitudinal center line thereof;

Figure 3 is an end elevational view with parts thereof shown in cross section, taken substantially at vantage line 3—3 of Figure 2;

Figure 4 is an end elevational view looking at the right-hand end of the Figure 1 assembly;

Figure 5 is a top plan view of a shock resistant member embodied in the assembly of Figure 2 and employed internally of the housing shown therein;

Figure 6 is a side elevational view of the shock resistant member of Figure 5;

Figure 7 is a top plan view of a second shock resistant member used in the assembly of Figure 2; and Figure 8 is a side elevational view of the member seen in Figure 7.

As will be recognized from Figure 1, the assembly 10 includes an outer housing comprising a body portion 12 and a removable cap portion 13. Exterior terminal connector tabs 14 and 15 are provided at opposite ends of the housing assembly. Within the housing assembly is mounted a tubular mercury relay 20, which by conventional practice, has an exterior metal shell 21 of tubular configuration, as illustrated, and constituting one electrode therefor. The electrode shell 21 is connected to the external terminal connector tab 14 by an axial electrode extension 22 welded to one end of the shell 21 while an internal electrode of the relay is joined to the second terminal tab 15 by an axial extension 23 at the opposite end of the envelope 21. A seal assembly 25 constituting a fused seal is provided between the envelope 21 and the electrode extension 23 to maintain an evacuated or pressurized atmosphere within the envelope 21.

The housing body portion 12, as previously stated, constitutes a substantially cylindrical envelope having an end wall 30 and cylindrical side walls 31. End wall 30 is provided with an opening (unnumbered) through which the electrode extension 22 projects, of which the terminal tab 14 comprises a generally flattened end portion thereof. In order to accommodate the passage of the flattened terminal tab 14 through the housing's end wall 30, a centrally located slotted aperture 33 is provided therein as viewed in Figure 3 of the drawings.

In addition to its cylindrical wall 31, housing portion 12 also includes a frusto-conical base wall portion 34 which merges with a secondary cylindrical wall portion 35 concentric with the cylindrical wall portion 31 and adapted to mate with an inwardly offset annular shoulder portion 40 at the inner end of a cylindrical side wall 41 for the cap member 13.

Cap member 13, in addition to the side wall 41, includes an end wall 43, which as viewed in Figure 4 of the drawings, is transverse to wall 41 and bears a central opening (unnumbered) for passage of the electrode extension 23 and a slotted opening 45 communicating with such central opening for the passage of the flattened connector tab 15.

In addition to the slotted aperture 45, end wall 43 is scored with an inset detent groove 46, transverse to slot 45 and matingly receptive of shoulders 47, 47 formed at the axially innermost end of the terminal tab 15. The wall 43 is also provided with a central interior recess 48 which receives and locates a first shock resistant insulator 50.

As shown in Figures 5 and 6, the insulator 50 comprises an annular gasket or grommet of rubber or a like shock absorbing material having sufficient resiliency to accept and absorb vibrational impact, as required. The annular body 51 of insulator 50 is apertured centrally at 52 for the coaxial passage of the electrode extension 23; in assembly the same being placed between the axially outermost end of the seal portion 25 and the interior inset recess 48 in the cap member 13. The central opening 52 therein is of a size to tightly embrace the exterior of the electrode extension 23 and effect a moisture proof seal therewith and when compressed axially to make a sealed junction with the face of recess 48. Additionally the elastomer selected for grommet 50 is resilient enough to permit passage of the connector terminal tab 15 through opening 52 without tearing the same.

A second resilient shock resistant seal means is provided at the left-hand end of the assembly, comprising an annular grommet insulator 60 shown in detail in Figures 7 and 8 of the drawings. Like insulator 50, member 60 has an annular body 61 bearing a central cylindrical opening 62 for the passage of the electrode extension 22. It will be noted that insulator 60 is substantially thicker than insulator 50 while preferably the diameter thereof is reduced somewhat to remain within the diametrical limits of housing portion 12. In this latter respect, insulator 60 is disposed between the exterior face of the housing end wall 30 and shoulders 65, 65 formed at the axially innermost end of the terminal connector tab 14.

In assembly, connector 14 is passed through aperture 33 in end wall 30, as previously related, and the shock absorbing grommet 60 thereafter is thrust over the terminal connector 14 to reside in close hugging relationship about the electrode extension 22 between housing end wall 30 and the tab shoulder members 65. The cylindrical base end portion 35 of the housing body is fitted concentrically over the inset shoulders 40 of the cap with tab 15 passing through slotted opening 45 so as to reside exteriorly of the end wall 43.

In this condition the cap portion is loosely held to the body portion 12. By axially compressing grommets 50 and 60, as by turning tab 14 transverse to slot 33 and pulling on tab 15, the two insulators 50 and 60 may be sufficiently compressed to permit the shoulder portions 47 of terminal tab 15 to clear the outer end face of the cap member under twisting action. This activity serves to align the tab 15 with the detent slot 46 formed in the outer face of the cap portion so that upon release of the compressing force, shoulders 47 will lock firmly in the detent recess, holding the housing portions tightly together. The assembly will remain in this condition until the shoulders on the tab 15 are positively removed from the detent slot 46.

From the foregoing, it will be recognized that the assembly provides a convenient means for holding the relay assembly 20 in a fixed position between and axially spaced from the ends of the housing assembly; the compressive load imposed on the insulators 50 and 60 working in conjunction with the detent slot 46 and shoulders 47 to prevent rotation of the relay assembly 20 relative to the housing. The compression of the grommets 50 and 60 is also sufficient to provide an effective moisture proof seal between the same and the adjacent faces of the housing and cap end walls which they respectively contact while the central openings in the grommets are of a diameter sufficiently small to insure an adequate radial compression to provide a moisture seal with the electrode extensions 22 and 23 which they surround. It is obvious also that the provision of the compressive seal members 50 and 60 serves to hold the relay 20 in a proper spaced condition relative to the housing, while providing sufficient resiliency to substantially absorb shock or vibrational impact imposed on the unit.

While the invention has been described hereinabove with relation to a particular assembly embodying a mercury relay and an appropriate housing therefor, it is obvious that the same has application with equal facility in arrangements other than those employing mercury relays. Therefore, it will be appreciated that numerous changes, modifications and substitutions of equivalents may be made therein without departing from the spirit and scope of this invention. It is therefore intended that this invention be limited only as may appear in the following appended claims.

We claim:
1. A mounting means for electrical devices comprising a housing, an electrical device mounted within said housing, circuit connective electrode means extending through one wall of said housing, circuit connector tab means formed on said electrode means exteriorly of said housing and presenting projecting shoulders exteriorly of said wall, and resilient shock absorbing means surrounding said connective electrode means and providing a moisture-proof seal with the same and said wall under compression, the said shock absorbing means being engaged by said shoulders and compressed between the same and said end wall.

2. An assembly for mounting mercury relays and like devices comprising an insulated housing having a tubular body portion and a removable closure cap therefor, the housing containing a mercury relay, electrode members extending from opposite ends of the relay through opposed end walls of said body portion and said cap, each of said electrodes being flattened adjacent its outer end to define a terminal connective tab presenting shoulders at the axially innermost ends thereof, shock absorbing members mounted on said electrodes and surrounding the same axially inward of said shoulders, one of said shock absorbing members being axially compressed exteriorly of said housing and the other being axially compressed interiorly of said housing.

3. The combination as set forth in claim 2 including detent means for engaging at least one of said tabs and holding the same against rotation.

4. A shock mount assembly for a mercury relay and the like, comprising, a housing of insulating material including a tubular body and a closure cap therefor, said body and cap having end walls enclosing opposite ends of the housing, the mercury relay being contained within the housing, electrode members of the relay extending axially through suitable openings formed in the said end walls, each electrode having a flattened terminal connector portion at its outer end, the said end walls of said body and cap portions having openings for the passage of said terminal connectors, a first resilient means disposed between one end of the relay and the said cap portion, a second resilient means disposed between the end wall of said body and one terminal connector of the adjacent electrode, and a detent recess formed in the end wall of the cap and engageable with the axially innermost end of the other terminal connector, axial compression of said resilient cushions serving to place the same under sufficient load to resiliently hold said cap and body tightly together and provide moisture-proof seals with the same.

5. An improved shock mounting for mercury relays and like electrical devices, comprising, a housing enclosing the relay and including a body and removable cap portions, coaxial electrodes of the relay extending through openings formed in opposed end walls of said body and cap portions, terminal connective tab members formed at the outer ends of said electrodes and projecting transversely thereof, slotted openings formed in the end walls of said body and cap portions for the passage of said tab members, and resilient shock absorbing members surrounding each electrode and forming moisure-proof seals with the same and the said end walls of the body and cap when compressed axially by disposing said tab members transverse to said slotted openings axially outward of said end walls.

6. An assembly of the class described comprising an insulated housing defined by a tubular body member closed at one end and opened at its other end, and a removable closure cap member for closing the open end of said tubular body member, an electrical device disposed within said housing and having end electrode members extending axially of the longitudinal axis of said tubular body member and outwardly through openings in said closed end of said tubular body member and said cap member, shock absorbing members on said electrodes adjacent the openings in said closed end of said tubular body member and said cap member, and means for retaining said shock absorbing members under compression axially of said housing with said cap member in position closing said open end of said tubular body member.

References Cited in the file of this patent
UNITED STATES PATENTS 2,706,742    Ehlers _____ Apr. 19, 1955